United States Patent
Miyato et al.

(10) Patent No.: US 8,811,434 B2
(45) Date of Patent: Aug. 19, 2014

(54) FIBER LASER APPARATUS AND METHOD OF DETECTING FAILURE OF FIBER LASER APPARATUS

(71) Applicant: Furukawa Electric Co., Ltd., Tokyo (JP)

(72) Inventors: Taizo Miyato, Tokyo (JP); Kosuke Kashiwagi, Tokyo (JP); Yoshihiro Emori, Tokyo (JP); Akira Fujisaki, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 13/903,533

(22) Filed: May 28, 2013

(65) Prior Publication Data

US 2013/0259069 A1 Oct. 3, 2013

Related U.S. Application Data

(63) Continuation of application No. PCT/JP2011/077527, filed on Nov. 29, 2011.

(30) Foreign Application Priority Data

Nov. 29, 2010 (JP) ................................ 2010-264855

(51) Int. Cl.
*H01S 3/30* (2006.01)
*H01S 3/00* (2006.01)

(52) U.S. Cl.
USPC ............................. 372/6; 372/38.1; 372/38.09

(58) Field of Classification Search
USPC .......................................... 372/6, 38.1, 38.09
See application file for complete search history.

(56) References Cited

U.S. PATENT DOCUMENTS 5,463,710 A * 10/1995 Filgas et al. ..................... 385/90
2006/0165343 A1 * 7/2006 Seifert ............................. 385/12

FOREIGN PATENT DOCUMENTS

| JP | 2003/227776 A | 8/2003 |
| JP | 2008/116789 A | 5/2008 |
| WO | WO 2004/088881 A1 | 10/2004 |

OTHER PUBLICATIONS

Abedin, "Remote Sensing of Fiber Fuse Propagation Using RF Detection", Nat. Instit. of Info. and Comm. Tech., 2009, 1-4.
International Patent Application No. PCT/JP2011/077527: International Search Report dated Dec. 27, 2011, 4 pages.
Seo et al., "Evaluation of High-Power Endurance in Optical Fiber Links", Furukawa Review, 2003, (24), 1-12.

\* cited by examiner

*Primary Examiner* — Armando Rodriguez
(74) *Attorney, Agent, or Firm* — Baker & Hostetler LLP

(57) ABSTRACT

A fiber laser apparatus in which pump light is introduced into an optical fiber to generate laser light includes a detecting section that detects signal light leaking out from a core of the optical fiber as leakage signal light, a determining section that determines that, in a case where there is a decrease in an intensity of the leakage signal light detected in the detecting section, a failure of the fiber has occurred, and a stopping section that stops, in a case where the determining section has determined that a failure of the fiber has occurred, the introduction of the pump light into the optical fiber. The detecting section detects the leakage signal light leaking out of a High Reflectivity FBG that is provided on a side opposite to an output side of the laser light.

21 Claims, 12 Drawing Sheets

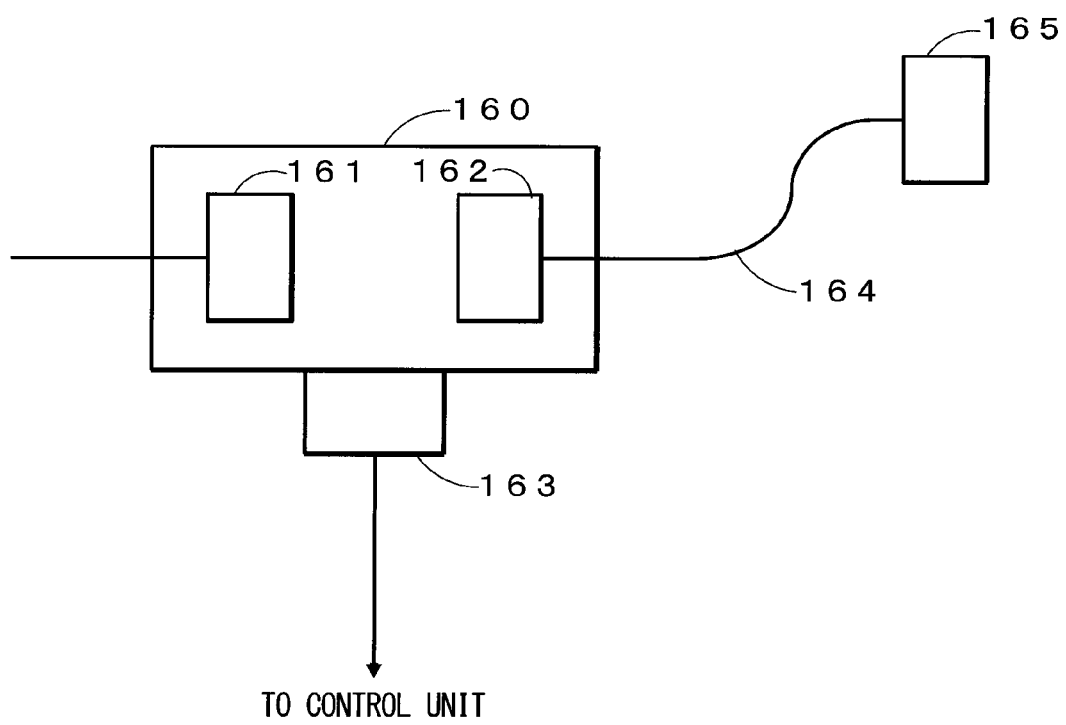
TO CONTROL UNIT
F I G. 13

FIBER LASER APPARATUS AND METHOD OF DETECTING FAILURE OF FIBER LASER APPARATUS

CROSS REFERENCE TO RELATED APPLICATIONS

This is a continuation application of International Patent Application No. PCT/JP2011/077527 filed Nov. 29, 2011, which claims the benefit of Japanese Patent Application No. 2010-264855, filed Nov. 29, 2010, the full contents of which are hereby incorporated by reference in its entirety.

BACKGROUND OF INVENTION

1. Field of the Invention

The invention relates to a fiber laser apparatus and a method of detecting a failure of the fiber laser apparatus.

2. Background of the Invention

Recently, there is an improvement in an intensity of fiber laser apparatuses that utilize an optical fiber as an oscillating device or an amplifying device and such fiber laser apparatuses are finding a broader use as machining laser apparatuses.

With such a fiber laser apparatus, a phenomenon referred to as a so-called "fiber fuse" may occur that causes an irreversible damage in a core of an optical fiber towards a light source. When such a fiber fuse occurs, there will be an increased financial loss since the fiber fuse breaks a fiber component that exists before reaching the light source.

In the related art, such a method of detecting a fiber fuse may be a method as disclosed in Japanese Laid-Open Patent Publication No. 2003-227776 in which light and a temperature of a fiber fuse are detected or a method as disclosed in International Publication No. WO2004/088881 in which pump light is split and observed, and determining that, in a case where a pump light intensity has decreased, a fiber fuse has occurred.

In order to detect light of a fiber fuse itself or a temperature change caused thereby as disclosed in Japanese Laid-Open Patent Publication No. 2003-227776, it is necessary to provide a monitoring mechanism at every possible position whereto the fiber fuse may propagate and thus an increased cost is required. When the monitoring mechanisms are provided at a fewer number of positions, there is a drawback of an increased repair cost, since it requires time to stop the laser and damaging of an optical element continues until the laser is stopped.

A method of sensing a pump light disclosed in International Publication No. WO2004/088881 has a following drawback. In a fiber laser apparatus constituted using a DCF (Double Clad Fiber), the pump light propagates in a clad. Accordingly, even if a fiber fuse is produced that damages the core only, the pump light may continue to propagate. Therefore, there is a possibility that an occurrence of a fiber fuse cannot be detected.

SUMMARY OF INVENTION

Accordingly, it is an object of the invention to provide a fiber laser apparatus and a failure detection method of the fiber laser apparatus that can positively detect a failure such as a fiber fuse or a disconnection in a fiber, that has occurred in a fiber.

In order to achieve the above object, according to an aspect of the invention, in a fiber laser apparatus in which pump light is introduced into an optical fiber to generate laser light, the fiber laser apparatus includes: a detecting section that detects signal light leaking out from a core of the optical fiber as leakage signal light; a determining section that determines that, in a case where there is a decrease in an intensity of the leakage signal light detected in the detecting section, a failure of the fiber has occurred; and a stopping section that stops, in a case where the determining section has determined that a failure of the fiber has occurred, the introduction of the pump light into the optical fiber.

With such configuration, it becomes possible to positively detect a failure, such as a fiber fuse or a disconnection in a fiber, that has occurred in a fiber.

Also, the invention includes, in addition to the above, the detecting section detects the leakage signal light leaking out of a connection of the optical fiber with another optical fiber.

With such a structure, since it is not necessary to add any new optical component for detecting an intensity of signal light, production costs can be reduced.

Also, in addition to the above, the connection is a fusion-spliced portion at which the optical fibers are fusion-spliced, and the detecting section detects the leakage signal light leaking out of the fusion-spliced portion.

With such a structure, since it is not necessary to add any new optical component for detecting an intensity of signal light, production costs can be reduced, and, by using a fusion-spliced portion in which an intensity of the leakage signal light is comparatively stable, an occurrence of a failure of the fiber can be detected positively and stably.

Also, in addition to the above, the connection includes the optical fibers arranged at a predetermined distance between each other. The detecting section detects the leakage signal light that diffuses and leaks from between the fibers.

With such a structure, since it is not necessary to add any new optical component for detecting an intensity of signal light, production costs can be reduced, and, since such a connection has a comparatively large size, a location at which the detecting section is provided can be obtained in a facilitated manner.

Also, in addition to the above aspect, the connection is a connection that is located nearest to an output end from which the laser light is outputted.

With such a structure, a failure of the fiber that has occurred at any location in the apparatus can be detected and a progress of the failure can be stopped.

Also, in addition to the above aspect, the detecting section detects the leakage signal light leaking out of a High Reflectivity FBG that is provided on a side opposite to an output side of the laser light.

With such a structure, a failure of the fiber occurring due to the signal light leaking out from the High Reflectivity FBG can be detected and the progress can be stopped.

Also, in addition to the above aspect, the detecting section detects the leakage signal light via an attenuating section that transmits the laser light and attenuates the pump light.

With such a structure, even if a pump light is mixed in a leakage signal light, a failure of the fiber can be positively detected.

Also, in addition to the above aspect, the detecting section is constituted by a photodiode, and the fiber laser apparatus further includes a correcting section that detects a temperature of the photodiode and corrects a detection signal of the photodiode based on a detected temperature.

With such a configuration, a detection error of the photodiode due to an ambient temperature can be corrected and an occurrence of false detection can be prevented.

Also, in addition to the above aspect, the invention further includes an amplifying section that amplifies the laser light by an optical fiber, wherein the detecting section detects leakage signal light that is the laser light outputted from the amplifying section leaking out from a core of the optical fiber.

With such a configuration, even if an amplifying section is present, an occurrence of the failure of the fiber can be positively detected and the progress can be stopped.

Also, in addition to the above aspect, the invention further includes a storing section that stores information indicating time taken from detection of a decrease in an intensity of the leakage signal light to stoppage of the pump light.

With such a configuration, since it becomes possible to know how far the failure of the fiber has progressed, it is possible to know quickly which optical component is to be repaired or replaced.

Also, in addition to the above aspect, the determining unit determines whether a failure of the fiber has occurred, based on one of a threshold which is a fixed value, a threshold which varies depending on the pump light or a setting of an intensity of the laser light, and a threshold which varies depending on a value of an electric current flowing through the laser diode that generates the pump light.

With such a configuration, by setting the threshold depending on purposes of use, it is possible to detect positively an occurrence of a failure of the fiber irrespective of the purposed of use.

Also, in addition to the above aspect, in a case where the laser light is a pulsed light, the determining unit determines an occurrence of a failure of the fiber based on an average value of intensities of the leakage signal light of a plurality of cycles.

With such a configuration, even in a case where pulse laser light is generated, an occurrence of a failure of the fiber can be detected positively.

Also, in addition to the above aspect, a pump light multiplexer that introduces the pump light into the optical fiber has a free port among a plurality of pump light introducing ports and at least one the terminating unit at a side opposite to a laser light-output side and the free port serves as a visible light introducing port.

With such a configuration, by using the visible light introducing ports, the failure occurrence location can be identified rapidly.

Also, in a method of detecting a failure of a fiber laser apparatus, a method of detecting a failure of a fiber laser apparatus in which pump light is introduced into an optical fiber to generate laser light, the method includes detecting leakage signal light leaking out from a core of the fiber as leakage signal light; determining that, in a case where an intensity of the detected leakage signal light has decreased, a failure of the fiber has occurred; and stopping, in a case where it is determined that a failure of the fiber has occurred, the introduction of the pump light into the optical fiber.

With such a method, an occurrence of a failure of the fiber can be detected positively.

According to an aspect of the invention, a fiber laser apparatus that can positively detect an occurrence of a failure of the fiber by a fiber fuse or a fiber disconnection, etc., and a failure detection method of the fiber laser apparatus can be provided.

BRIEF DESCRIPTION OF DRAWINGS

FIG. 13 is a diagram showing a variant embodiment of the invention.

DETAILED DESCRIPTION

Hereinafter, an embodiment of the invention will be described in detail with reference to the accompanying drawings.

An embodiment of the invention will now be described. The following description is directed to embodiments in which a progress of a fiber fuse is stopped in a case where the fiber fuse has occurred, but the embodiments are not limited thereto. The invention has a function of sensing an overall failure that has occurred in a fiber, such as disconnection of the fiber.

(A) First Embodiment

Figure 1:
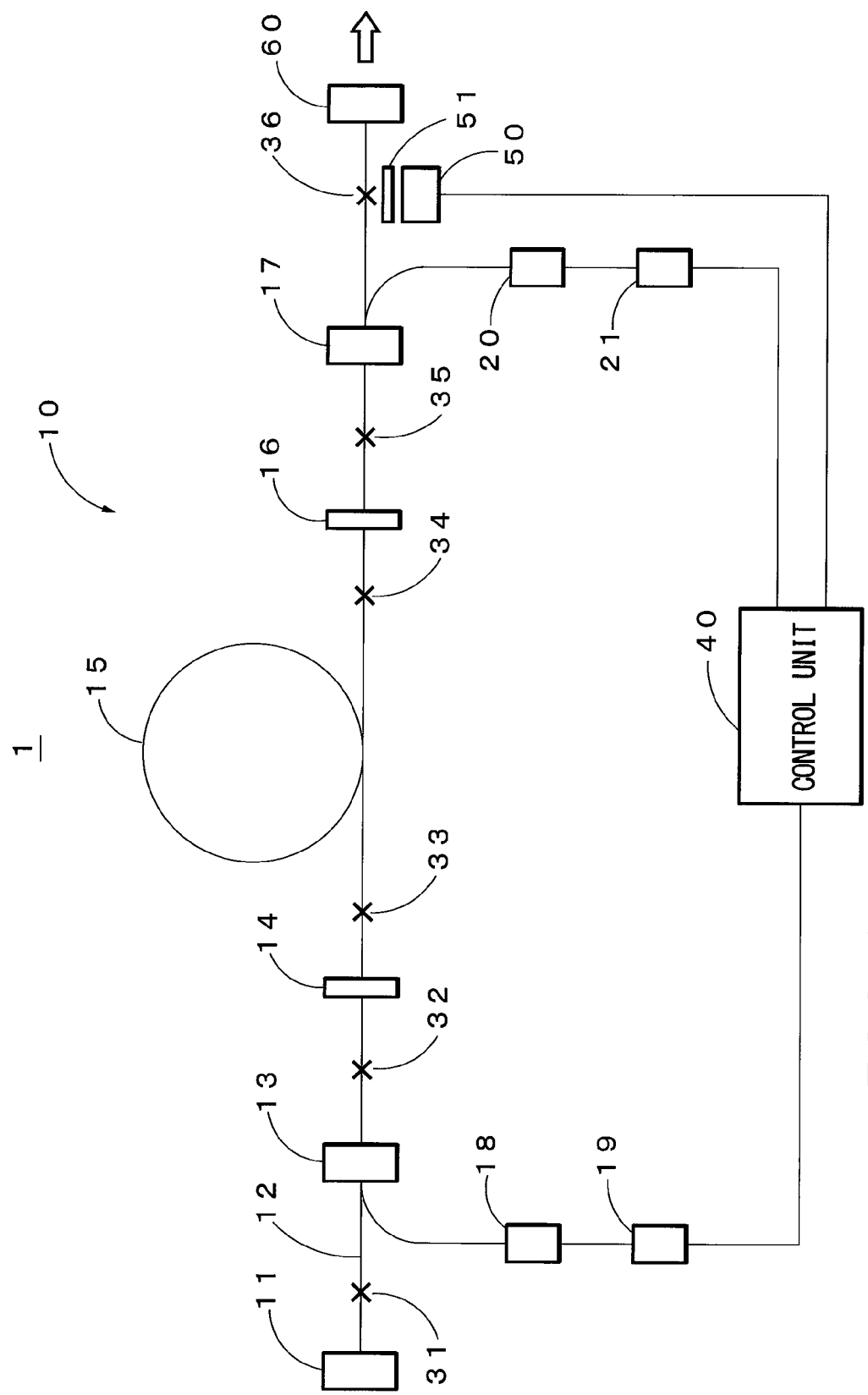
FIG. 1 is a diagram showing an exemplary configuration of a first embodiment of the invention.

FIG. 1 is a diagram showing an exemplary configuration of the first embodiment of the invention. As shown in FIG. 1, a fiber laser apparatus 1 of the first embodiment includes, as its main constituent elements, a terminating unit 11, an optical fiber 12, pump light multiplexers (TFBs (Tapered Fiber Bundles)) 13 and 17, an HR 14, an amplification optical fiber 15, an OC 16, pumping LDs (Laser Diodes) 18 and 20, pumping LD driving power sources 19 and 21 (correspond to "stopping section" in the claims), a control unit 40 (corresponds to "determining section" in the claims), a PD (Photodiode) 50 (corresponds to "detecting section" in the claims), a pump light cutting filter 51 (corresponds to "attenuating section" in the claims) and an output optics section 60. The terminating unit 11, the optical fiber 12, the pump light multiplexers 13 and 17, the HR 14, the amplification optical fiber 15, the OC 16, the LDs 18 and 20, and the pumping LD driving power sources 19 and 21 constitute the laser oscillating device 10.

Here, the terminating unit 11 is constituted by, for example, a seed light source that generates seed light, a PD that detects leakage light or an attenuating section on which optical fiber is wound. The optical fiber 12 is constituted by, for example, a single-mode fiber and propagates laser light that is signal light. The pump light multiplexer 13 introduces the laser light outputted from the pumping LD 18 into a cladding of the optical fiber as pump light. The HR 14, which is a total reflection fiber grating referred to as an HR-FBG (High Reflectivity Fiber Bragg Grating), is formed by periodically varying a refractive index of the optical fiber and reflects the signal light from the amplification optical fiber 15 at a reflectivity near 100%. The amplification optical fiber 15 is constituted by a DCF (Double Clad Fiber) having a single mode core doped with, for example, ions of rare earth elements such as Er (Erbium), Yb (Ytterbium), etc., and, for example, oscillates and outputs signal light of 1080 nm. The DCF is configured in such a manner that the cladding is double layered and the pump light is propagates through an inner cladding.

Similarly to the HR 14, the OC 16, which is referred to as an OC-FBG (Output Coupler Fiber Bragg Grating) is formed by periodically varying the refractive index of the optical fiber, and passes a part (e.g., 10%) of the signal light from the amplification optical fiber 15 and reflects the remaining part. An optical fiber resonator is constituted by the HR 14, the OC 16 and the amplification optical fiber 15.

The pump light multiplexer 17 introduces laser light outputted from the pumping LD 20 into the cladding of the optical fiber as pump light. The pumping LDs 18 and 20 are constituted by, for example, one or more multimode laser diodes of a wavelength of 915 nm and having an output light intensity of greater than or equal to several Watts (W). The pumping LD driving power sources 19 and 21 drive the pumping LDs 18 and 20, respectively, in response to the control by the control unit 40. As shown in FIG. 1, each optical component is constituted by an optical fiber. Fusion-spliced portions 31-36 are connecting portions produced when the optical fibers 12 of the respective optical component are fusion-spliced with each other. Although it depends on the type of fusion splicing, in order to connect the optical fibers, it is desirable that the optical fiber of each optical component has a length of several tens of centimeters (cm). On the contrary, if the length of the optical fiber is increased, Raman scattered light having a peak-to-peak value at a frequency lower than a frequency of the signal light by 14 THz appears significantly due to a nonlinear optical effect. Since the Raman scattered light has a frequency that is different from the target signal frequency, it is desirable to suppress the Raman scattered light as much as possible, and it is desirable not to make the fiber length too long. Therefore, for example, each optical component other than the amplification optical fiber 15 is configured to have a reduced fiber length of about 1 m.

Figure 2:
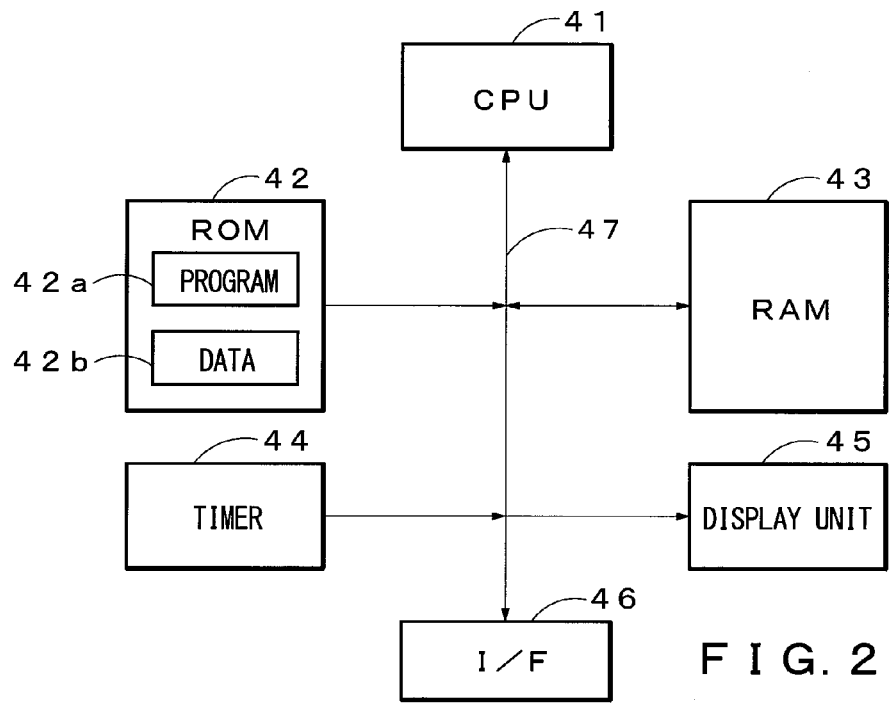
FIG. 2 is a diagram showing an exemplary configuration of a control unit shown in FIG. 1.

As shown in FIG. 2, the control unit 40 includes, as its main constituent elements, a CPU (Central Processing Unit) 41, a ROM (Read Only Memory) 42, a RAM (Random Access Memory) 43 (corresponds to a "storing section" in the claims), a timer 44, a display unit 45, an I/F (Interface) 46 and a bus 47. Here, the CPU 41 controls each unit based on a program 42*a* and data 42*b* stored in the ROM 42. The ROM 42 is a nonvolatile semiconductor storage unit, and stores the program 42*a* and the data 42*b*. RAM 43 is a volatile semiconductor storage unit, and serves as a work area when the CPU 41 executes a program. The timer 44 generates and outputs time and date information. The display unit 45 displays information supplied from the CPU 41. The I/F 46 is constituted by, for example, a DAC (Digital Analog Converter) and an ADC (Analog Digital Converter), and converts digital data supplied from the CPU 41 into an analog signal and supplies it to the pumping LD driving power sources 19 and 21, and also converts an analog signal outputted from the PD 50 into digital data and supplies it to the CPU 41. The bus 47 is a signal line group that interconnects the CPU 41, the ROM 42, the RAM 43, the timer 44, the display unit 45 and the I/F 46 and enables data transfer between them.

Referring again to FIG. 1, the PD 50 converts leakage signal light, which is a part of the signal light (in this example, laser light of 1080 nm) propagating through the core of the optical fiber 12 that leaks out through the fusion-spliced portion 36, into an electric signal and supplies it to the control unit 40. The pump light cutting filter 51 is an optical filter that attenuates the pump light (in this example, a laser light of 915 nm) contained in the leakage signal light and passes the signal light. The output optics section 60 has a function of concentrating the signal light outputted from the optical fiber 12 onto a working surface of a work piece.

Figure 3:
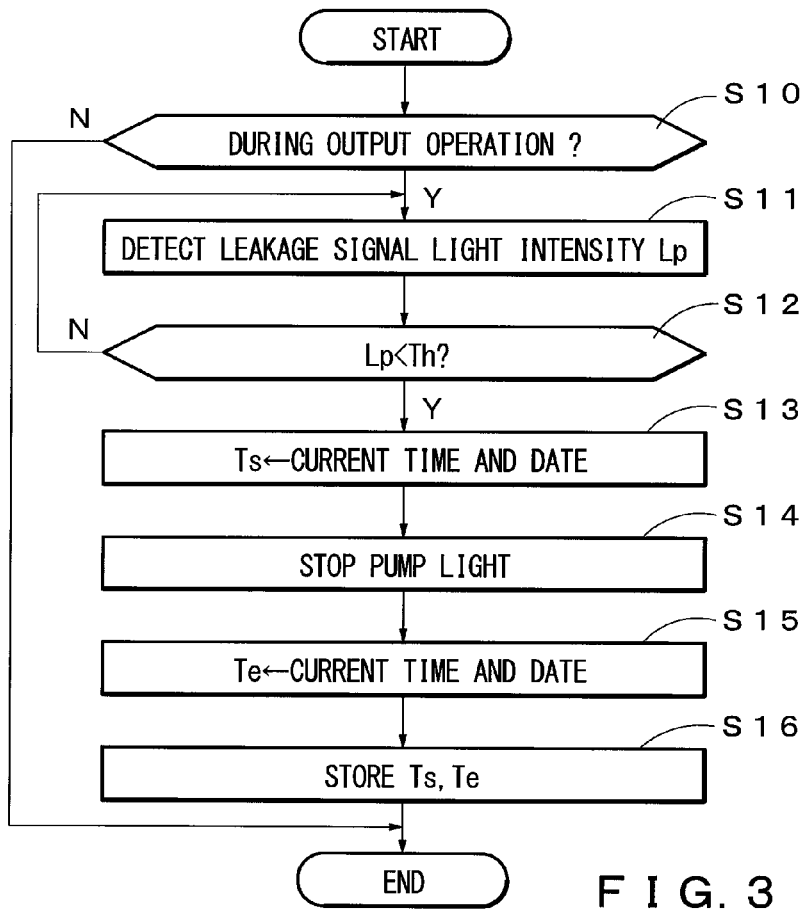
FIG. 3 is a flowchart for explaining a flow of processes performed in the first embodiment shown in FIG. 1.

Now, an operation of the first embodiment will be described. FIG. 3 is a flow chart for explaining an example of a process performed in the first embodiment shown in FIG. 1. The process of this flow chart is implemented by the program 42*a* shown in FIG. 2 read out and executed by the CPU 41. In this flow chart, in a case where an intensity Lp of the leakage signal light leaking out from the fusion-spliced portion 36 is less than a predetermined threshold Th, it is determined that a fiber fuse has occurred in the optical fiber 12 and the pump light is stopped. When a process of this flow chart is started, the following steps are carried out.

Step S10: The CPU 41 determines whether it is currently during an output operation of the laser light or not, and in a case where it is during the output operation (step S10: Yes), it proceeds to step S11, and else (step S10: No), terminates the process. Specifically, during the output operation of the laser light, the CPU 41 acquires drive data corresponding to the required optical output from the data 42*b* in the ROM 42 and controls the pumping LD driving power sources 19 and 21 based on the drive data. Therefore, in a case where the pumping LD driving power sources 19 and 21 are being controlled, the process proceeds to step S11.

Step S11: The CPU 41 inputs an output signal of the PD 50 via the I/F 46, and detects the intensity Lp of the leakage signal. Specifically, when the fiber laser apparatus 1 is during the output operation, the signal light outputted from the pump light multiplexer 17 is irradiated onto the working surface of the work piece via the output optics section 60. A part (e.g., around several tenths of percent) of the signal light propagating through the core of the optical fiber 12 leaks outside as leakage signal light while passing through the fusion-spliced portion 36 in which medium of the core is partly discontinuous. At this time, although a part of the pump light leaks out from the cladding, it is will be attenuated by the pump light cutting filter 51 to a level that does not influence the pump light. As has been described above, after the attenuation of the pump light by the pump light cutting filter 51, the optical signal that has leaked out of the fusion-spliced portion 36 is incident on the PD 50. The PD 50 converts the leakage signal light incident thereon into a corresponding electric signal and supplies it to the control unit 40. In the control unit 40, the I/F 46 converts an analog signal corresponding to the intensity of the leakage signal light that is supplied to from the PD 50 into digital data, and supplies it to the CPU 41.

Step S12: The CPU 41 compares the intensity Lp of the leakage signal light detected in the Step S11 and the threshold Th, and in a case where the intensity Lp of the leakage signal light is less than the threshold Th (step S12: Yes), the process determines that it is highly possible that a fiber fuse has occurred and proceeds to step S13, and else (step S12: No) returns to the step S11 and repeats the similar process as described above. Specifically, in a case where a fiber fuse has occurred, the core of the optical fiber 12 will be damaged and the signal light will not propagate through the core. Therefore, the leakage signal light that leaks from the fusion-spliced portion 36 will also attenuate. Thus, in a case where the intensity Lp of the leakage signal light is less than the threshold Th, it can be determined that it is highly possible that a fiber fuse has occurred. The threshold Th may be determined by any of the three specific methods described below.

(1) Method in which a constant value is used as a threshold regardless of an intensity of output light.

In the fiber laser apparatus 1, there are many cases where the intensity of the output light can be varied depending on the kind of work piece or the purpose of work, and as a first example, it is conceivable to always keep the threshold constant (fixed value) regardless of the intensity of the output light. In this case, as a method of setting the threshold, for example, the threshold can be determined as:

$$Th = \gamma \times Lp\min \text{ (here, } \gamma < 1 \text{ (e.g., } \gamma = 0.1)),$$

where, Lp min is an intensity of leakage signal light for a case where the output intensity of the fiber laser apparatus 1 is at the lowest.

(2) Method in which a threshold corresponding to a setting value of the output light is used.

In a case where the fiber laser apparatus 1 can change the intensity of the output light, the control unit 40 drives the pumping LD driving power sources 19 and 21 depending on the setting value of the output light. Therefore, when the setting value is known, the optical output value can be obtained and the intensity of the leakage signal light can also be estimated to some extent. When the intensity of the leakage signal light can be estimated, the threshold can be set to a value that is lower than the estimated intensity of the leakage signal light by a predetermined ratio. That is to say, as a second example, for example, it is conceivable to create a table in which the setting and the threshold are matched, and to retrieve, from the table, and use the threshold that corresponds to the setting. In a case where a certain relationship (e.g., Lp=f (Sv) (f( ) is a predetermined function) exists between the setting value Sv and the intensity Lp of the leakage signal light, the threshold Th may be determined as $Th = \alpha \times f(Sv)$, instead of using the table. Here, $\alpha < 1$.

(3) Method in which a threshold corresponding to an electric current monitor value is used.

The control unit 40 monitors an electric current flowing through the pumping LDs 18 and 20. The monitored current value is a value that accurately reflects an optical output at that point of time. Accordingly, the threshold Th can be determined by using the monitored current value Im in a similar manner to the setting value Sv described above in (2). Specifically, a table in which the electric current value Im and the threshold Th are matched may be created or the threshold Th may be obtained by $Th = \beta \times f(Im)$. Here, $\beta < 1$. Alternatively, two monitors may be prepared, one of them being a pump light power monitor (a monitor having a cutting filter that cuts a fiber laser output wavelength or a monitor without a filter) and the other being a power monitor for a fiber laser (a monitor having a transmission filter that transmits a fiber laser wave length only) and the threshold may be set by using a relationship such as a ratio between the two.

Note that, in the aforementioned example, it was assumed that the signal light is a CW (Continuous Wave), but in a case of a pulse form, for example, an average value La of the intensity of the leakage signal light over one period or a plurality of periods may be obtained and determined based on the average value La. In such a case, the threshold may be a smaller value in response to a duty ratio of the pulse as compared to the case of CW. For example, it can be assumed to be a value of 50% of the threshold Th when the duty ratio is 50%. In addition, it can be assumed to be a value of 40% of the threshold Th when it is 40%.

Step S13: The CPU 41 acquires current time and date Ts from the timer 44. Information outputted from the timer 44 includes year, month, day and time (hour, minute and second), and seconds contain information in the units of, for example, 1/100 second.

Step S14: The CPU 41 stops the operation of the pumping LD driving power sources 19 and 21. As a result, since the driving current will not be supplied to the pumping LDs 18 and 20, pump light will not be outputted from the pumping LDs 18 and 20, and an output of the signal light from the fiber laser apparatus 1 will be stopped. For example, in a case where a fiber fuse has occurred near the fusion-bonded section 36, the fiber fuse progresses towards the pump light multiplexer 17 (towards the left-hand side in the diagram). Since the supply of the signal light to the fiber fuse is stopped when the pump light is stopped by the process of the step S14, the progress of the fiber fuse stops.

Step S15: The CPU 41 acquires current time and date Te from the timer 44. Note that, the information outputted from the timer 44 is similar to that of the case of the step S13.

Step S16: The CPU 41 stores Ts and Te acquired in the steps S13 and S15 into the RAM 43. Ts and Te thus stored may be made visible by being displayed on the display unit 45. Also, by knowing these Ts and Te, it is possible to know the time and date of an occurrence of a fiber fuse and the time between the occurrence and the stoppage of the progress. Thereby, for example, in addition to knowing the time of occurrence of the fiber fuse, it is possible to know how far the fiber fuse has progressed by knowing the time taken until the progress has stopped. More particularly, it is known that the fiber fuse propagates through the optical fiber at a speed of about 1 m/sec, and that the fiber fuse often occurs at a part where the intensity of the signal light is high and medium is discontinuous (e.g., such as a connecting portion between the optical fiber 12 and the output optics section 60). Therefore, in a case where the difference between Ts and Te is, for example, 0.05 seconds, since it can be estimated that the fiber fuse has progressed to a position near 5 cm from the connecting portion of the output optics section 60, it is possible to know which optical component has been damaged and to rapidly know which component should be replaced. Of course, in order to know accurately, it is desirable to introduce visible laser light into the core of the optical fiber 12 to find the point at which propagation of the visible laser light is stopped. Also, in order to carry this out, the fiber laser apparatus 1 may be provided with a visible laser light introducing section by utilizing a free port of the pump light multiplexer (TFB) or the terminating unit 11. In this manner, since the diagnosis of a damaged portion can be performed more easily and quickly, time required for repair can be minimized and availability of the fiber laser apparatus 1 can be improved.

As described in the above, according to the first embodiment of the invention, since the leakage signal light from the fusion-spliced portion 36 of optical fiber 12 is detected and it is determined that a fiber fuse has occurred when the intensity Lp of leakage signal light has become less than the predetermined threshold Th, an occurrence of a fiber fuse can be positively detected. Also, in the first embodiment, by providing a single PD 50 only, since a fiber fuse that has occurred at any part of fiber laser apparatus 1 can be detected, the occurrence of the fiber fuse can be positively detected at a low cost.

Also, as has been described above, since the length of an optical fiber length of each optical component is several tens of centimeters (cm), in order to prevent the propagation of the fiber fuse to other components, it is desirable that time taken between the occurrence of the fiber fuse and the stoppage of the pumping LD is, for example, within 100 ms. To that end, for example, it is desirable to use the control unit 40 having a speed with which the process of the steps S11 to S14 in the flow chart shown in FIG. 3 can be terminated within, for example, 100 ms. Of course, it is desirable that the processes of the steps S11 and S12 shown in FIG. 3 are repeated within several milliseconds (ms). General values are as follows: assuming that the fiber length from the point of occurrence of the fiber fuse to the monitoring point (fusion-spliced portion 36) is 20 m, an influence of a decrease in the optical intensity propagates to the monitoring point sufficiently earlier than 1 μs from the occurrence; time taken between a change in amount of light and a change in an electric signal of the PD 50 is in the order of 1 μs; time taken until determination of a failure occurrence is about 10 ms; the time taken between the sending out of the electric current drive stopping signal and a decrease in the intensity of the pump light is in the order of 1 ms. Therefore, since it is possible to stop the driving within a time of about 10 ms or slightly longer in total, the failure length of the optical fiber due to the fiber fuse will be approximately 1 cm. Depending on the driving method and the detecting method, it may be necessary to provide a delay time in the determining of the failure occurrence from the viewpoint of prevention of a false detection, and, as has been described above, for example, when outputting a pulse-shaped signal light, it is necessary to provide a delay time of one cycle or a plurality of cycles. For example, when providing a delay of about two cycles in the case of pulse-shaped output of 100 Hz, a delay time of about 0.02 seconds may be provided.

In this manner, even if a fiber fuse occurs, the progress of the fiber fuse can be suppressed by stopping the pumping LD at an appropriate timing. Therefore, according to the invention, a failure of optical components can be minimized and, even in a case where the repair is necessary, the cost can be reduced. Particularly, all optical components can be reused in a case where a fiber fuse has begun at a fusion-spliced point.

As in the aforementioned embodiment, in a case where the time taken between an occurrence of a light output failure of the fiber laser and the blocking of the pump light, the progress of fiber fuse stops at about 1 cm. At this time, if the fiber length of the each component is greater than about 5 cm, the optical component can be reused by cutting the point of occurrence of the fiber fuse and fusion splicing the remaining fiber. In this case, it is preferable that the optical fiber length of each optical component is about 5-30 cm, since it can be reused after the occurrence of the fiber fuse and Raman scattering can be effectively suppressed.

Further, specifically, in the fiber laser of a CW drive, when the time taken until determination of the aforementioned failure occurrence becomes shorter than the relaxation time (about 1 ms) of the dopant doped in the core of the DCF, the relaxation time becomes dominant during a time between the occurrence of a fiber laser light output failure to the output stoppage. In this case, since the fiber fuse stops at about 1 mm, with the fiber length necessary for fusion-splicing being, for example, about 5 mm, it is preferable that the fiber length of each component is greater than or equal to 1 cm, and more specifically, about 1-5 cm, since each optical component can be reused while suppressing Raman scattering.

The aforementioned relationships can be summed up as follows. With L being a fiber length (single-ended) of the optical component, Lmin being a minimum fiber length of an optical component necessary for fusion-splicing, v being a speed of progress of the fiber fuse (v>0), and τ being time taken from an occurrence of a fuse to a cutoff (τ=detection time+determination time+light intensity decreasing time), the following equation is established. Note that, "⇔" shows that expressions on the right hand side and the left hand side are equivalent.

$$L\text{min} < L - v \times \tau \Leftrightarrow \tau < (L - L\text{min})/v \Leftrightarrow \tau < \Delta/v,$$

Here, Δ=L−Lmin (Δ>0).

That is to say, the optical fiber length of each optical component is set in such a manner that, when it is decreased by a length (v×τ) of progression from an occurrence to a stoppage of the fiber fuse, a remaining length is longer than the minimum fiber length L min of the optical component necessary for fusion-splicing. Alternatively, time τ is set to be shorter than the time taken for the fiber fuse to progress by a length Δ.

(B) Second Embodiment

Figure 4:
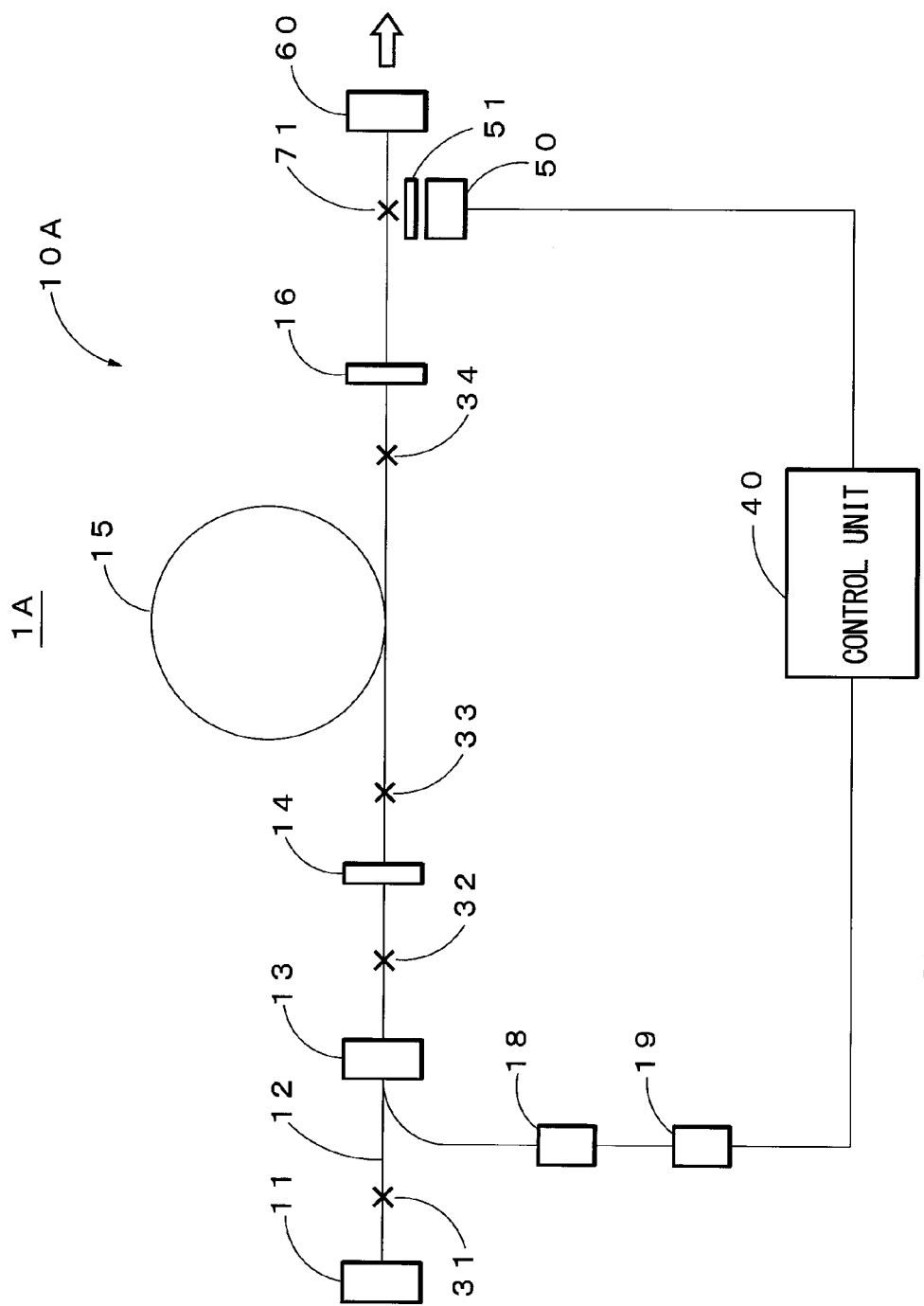
FIG. 4 is a diagram showing an exemplary configuration of a second embodiment of the invention.

FIG. 4 is a block diagram showing an exemplary configuration of a second embodiment of the invention. In FIG. 4, portions corresponding to those shown in FIG. 1 are labeled with the same reference numerals as in FIG. 1, and explanations thereof are omitted. In the fiber laser apparatus 1A of the second embodiment shown in FIG. 4, as compared to the case of FIG. 1, the pumping LD 20, the pumping LD driving power source 21 and the pump light multiplexer 17 are omitted. That is, a bidirectional pumping mode is employed in the embodiment of FIG. 1, and a forward pumping mode is employed in the second embodiment. Also, the PD 50 detects leakage signal light from a fusion-spliced portion 71 between the OC 16 and the output optics section 60.

In the second embodiment, although a pumping method is different from that of the first embodiment, a fiber fuse can be detected and its progress can be stopped by a process shown in FIG. 3 similarly to the first embodiment. Also, in the second embodiment, since the pumping LD 20 does not exist, it is desirable to set the threshold Th of step S12 accordingly.

(C) Third Embodiment

Figure 5:
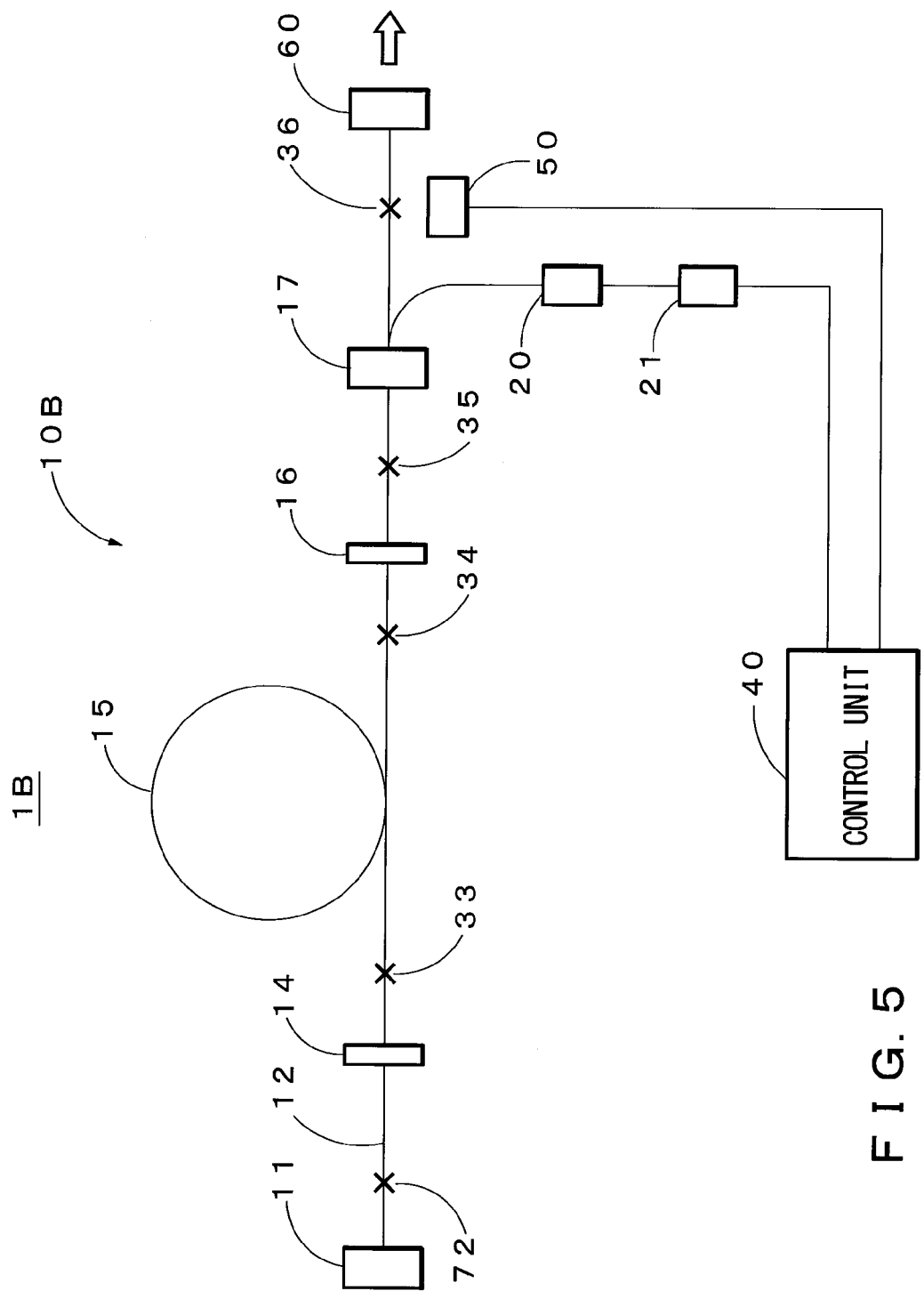
FIG. 5 is a diagram showing an exemplary configuration of a third embodiment of the invention.

FIG. 5 is a block diagram showing an exemplary configuration of a third embodiment of the invention. In FIG. 5, portions corresponding to those shown in FIG. 1 are labeled with the same reference numerals as in FIG. 1, and explanations thereof are omitted. In the fiber laser apparatus 1B of the third embodiment shown in FIG. 5, as compared to the case of FIG. 1, the pumping LD 18, the pumping LD driving power source 19 and the pump light multiplexer 13 are omitted. That is, a bidirectional pumping mode is employed in the embodiment of FIG. 1, and a backward pumping mode is employed in the third embodiment. In the case of a backward pumping mode, since the pump light is not outputted on the fusion-spliced portion 36 side, the pump light cutting filter 51 is omitted.

In the third embodiment, although a pumping mode is different from that of the first embodiment, a fiber fuse can be detected and its progress can be stopped by a process shown in FIG. 3 similarly to the first embodiment. Also, in the third embodiment, since the pumping LD 18 does not exist, it is desirable to set the threshold Th of step S12 accordingly.

(D) Fourth Embodiment

Figure 6:
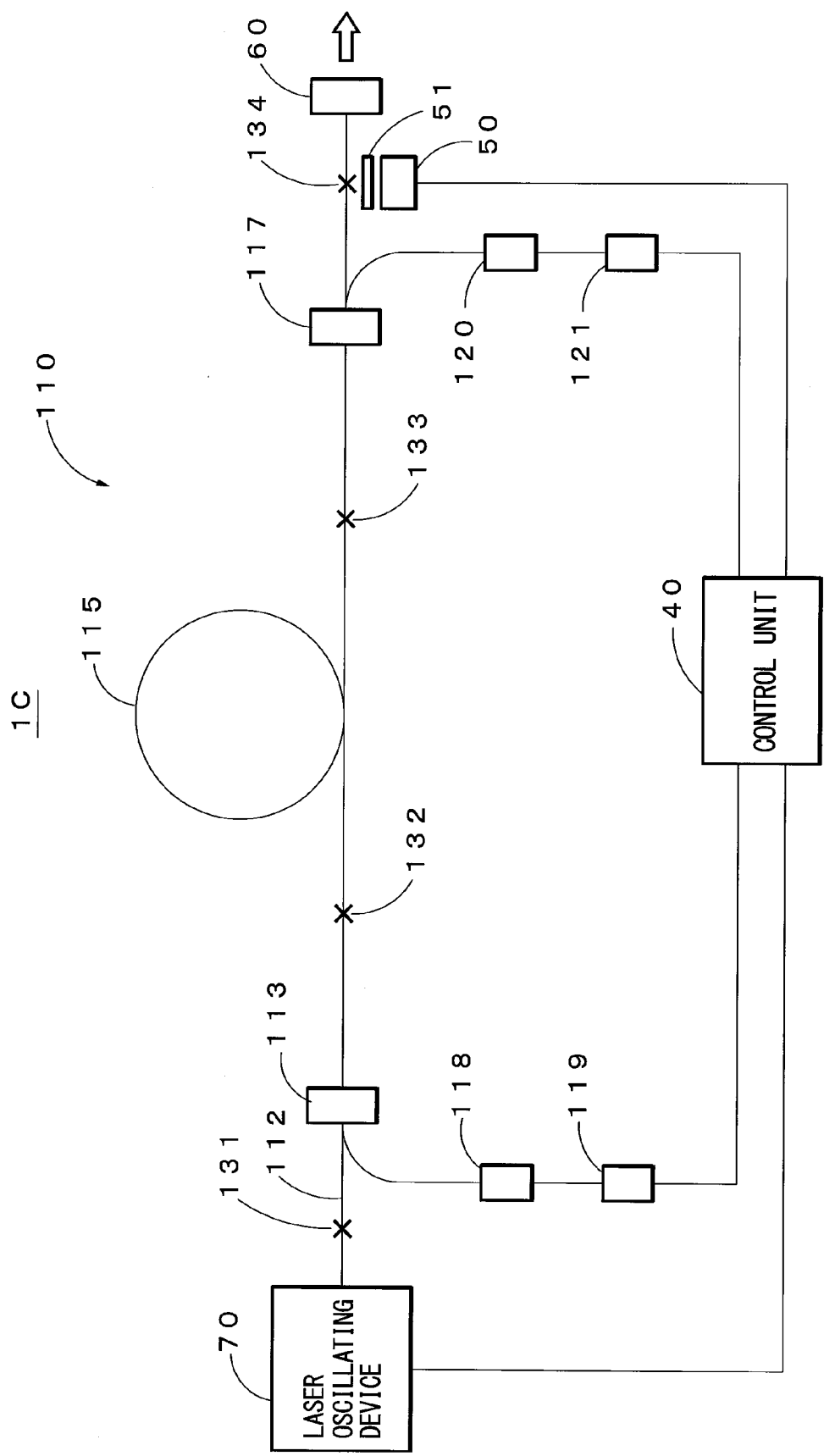
FIG. 6 is a diagram showing an exemplary configuration of a fourth embodiment of the invention.

FIG. 6 is a block diagram showing an exemplary configuration of a fourth embodiment of the invention. In fiber laser apparatus 1C of the fourth embodiment shown in FIG. 6, the laser oscillating devices 10, 10A, and 10B shown in FIGS. 1, 4 and 5 are shown as a laser oscillating device 70. The signal light outputted from the laser oscillating device 70 is inputted into the laser amplifying device 110 at a downstream stage, and after the amplification of the optical intensity, outputted via the output optics section 60. Here, the laser amplifying device 110 has, as its main constituent elements, an optical fiber 112, pump light multiplexers 113 and 117, an amplification optical fiber 115, pumping LDs 118 and 120, and pumping LD driving power sources 119 and 121. The fusion-spliced portions 131-134 are formed by fusion-splicing the optical fiber 112 of each optical component. The control unit 40 controls the pumping LD driving power sources 119 and 121 and controls the pumping LD driving power source installed in the laser oscillating device 70.

In the fourth embodiment, signal light outputted from the laser oscillating device 70 is introduced into the core of the optical fiber 112 and the pump lights outputted from the pumping LDs 118 and 120 are introduced into the cladding. The amplification optical fiber 115 amplifies the signal light introduced into the core based on the pump light introduced into the cladding and outputs it from the output optics section 60. The leakage signal light from the fusion-spliced portion 134 is incident on the PD 50 via the pump light cutting filter 51. The PD 50 converts the leakage signal light into an electric signal and supplies it to the control unit 40.

An operation of the fourth embodiment will be described. In the fourth embodiment, a fiber fuse may occur in both of the laser oscillating device 70 and the laser amplifying device 110. In a case where a fiber fuse has occurred on an output side of the laser amplifying device 110, since the fiber fuse propagates from the right hand side to the left hand side in the figure in the laser amplifying device 110, the signal light will not propagate to the right hand side of the fiber fuse. Therefore, in accordance with the process of FIG. 3, with an operation similar to that of each embodiment described above, a fiber fuse can be detected and the progress can be stopped. On the other hand, similarly, in a case where fiber fuse has occurred on the output side of the laser oscillating device 70, a fiber fuse propagates from the right hand side to the left hand side in the figure in the laser oscillating device 70, the signal light will not propagate to the right hand side of the fiber fuse, and thus the fiber fuse can be detected with the process of FIG. 3. In the process of step S14, by stopping both pumping LDs of the laser oscillating device 70 and the laser amplifying device 110, the progress of the fiber fuse can be stopped. Also, in the case of the fourth embodiment, since the laser amplifying device 110 has two pumping LDs 118 and 120 and the laser oscillating device 70 has at least one pumping LD, it is desirable to set the threshold Th in accordance with the number of these pumping LDs.

(E) Fifth Embodiment

Figure 7:
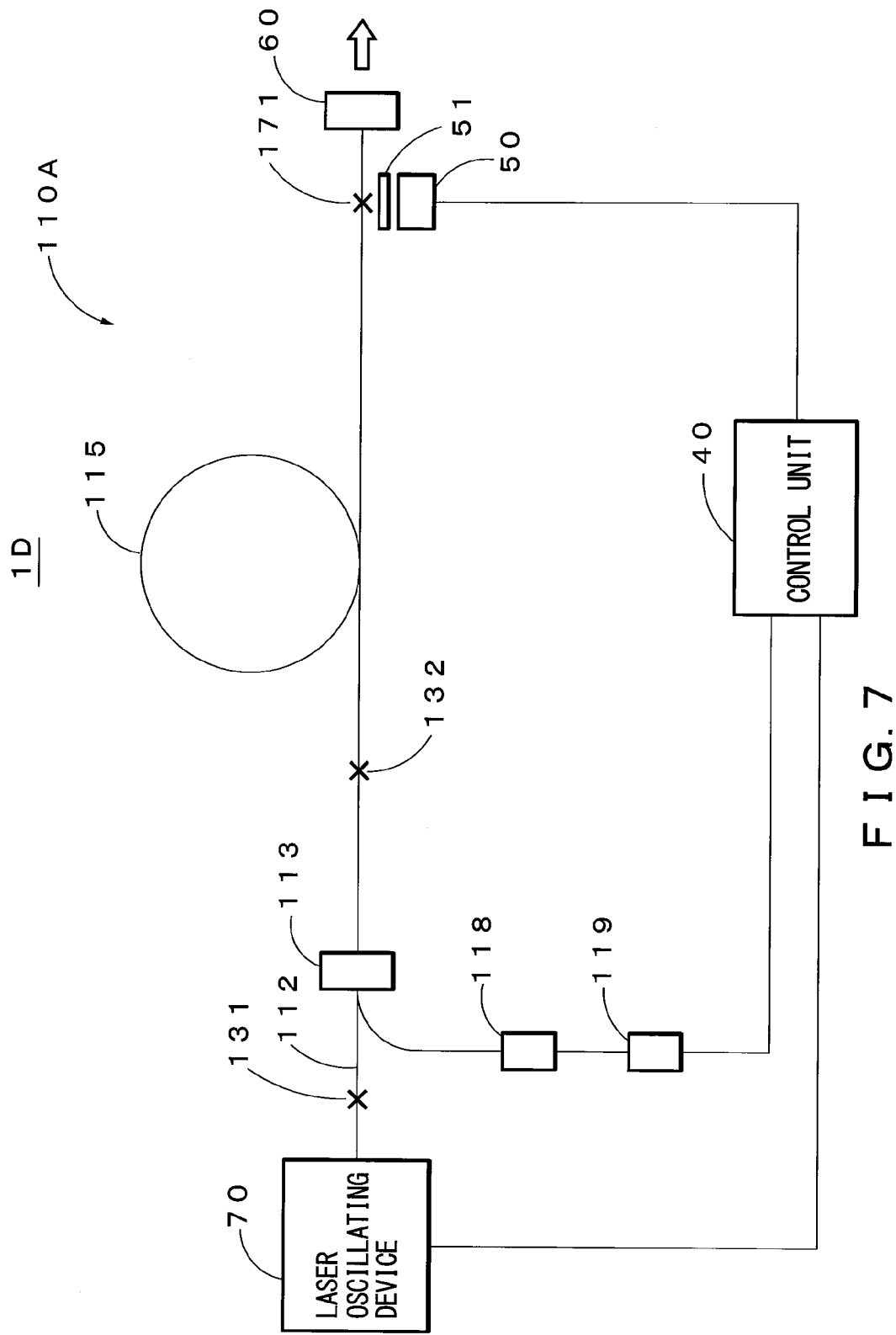
FIG. 7 is a diagram showing an exemplary configuration of a fifth embodiment of the invention.

FIG. 7 is a block diagram showing an exemplary configuration of a fifth embodiment of the invention. In FIG. 7, portions corresponding to those shown in FIG. 6 are labeled with the same reference numerals as in FIG. 6, and explanations thereof are omitted. In the fiber laser apparatus 1D of the fifth embodiment shown in FIG. 7, as compared to the case of FIG. 6, the pump light multiplexer 117, the pumping LD 120, and the pumping LD driving power source 121 are omitted. Also, a PD 50 detects leakage signal light from a fusion-spliced portion 171. Other structures are similar to those in the case of FIG. 6.

In the fifth embodiment, similarly to the case of the fourth embodiment, based on the process shown in FIG. 3, a fiber fuse is detected, the pumping LD is stopped, and the progress of the fiber fuse can be stopped. Note that, in the fifth embodiment, since the laser amplifying device 110A has a single pumping LD 118 only, in the process of step S14, the pumping LD driving power source 119 is stopped along with the pumping LD driving power source of the laser oscillating device 70. Also, it is desirable that the threshold Th is set in accordance with the number of the pumping LDs.

(F) Sixth Embodiment

Figure 8:
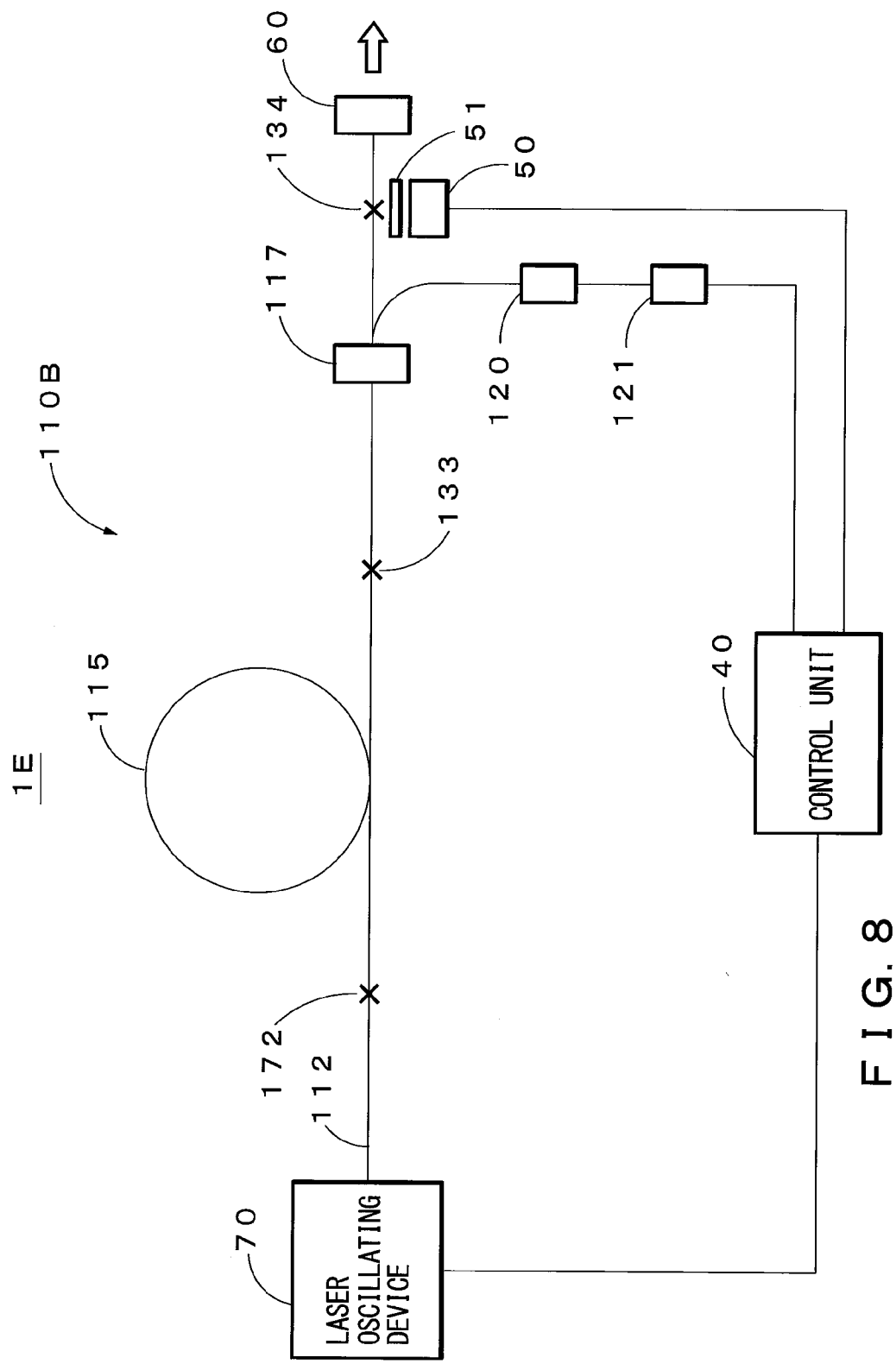
FIG. 8 is a diagram showing an exemplary configuration of a sixth embodiment of the invention.

FIG. 8 is a block diagram showing an exemplary configuration of a sixth embodiment of the invention. In FIG. 8, portions corresponding to those shown in FIG. 6 are labeled with the same reference numerals as in FIG. 6, and explanations thereof are omitted. In the fiber laser apparatus 1E of the sixth embodiment shown in FIG. 8, as compared to the case of FIG. 6, the pump light multiplexer 113, the pumping LD 118, and the pumping LD driving power source 119 are omitted. Other structures are similar to those in the case of FIG. 6.

In the sixth embodiment, similarly to the fourth embodiment, based on the process of FIG. 3, a fiber fuse can be detected, the pumping LD can be stopped and the progress of the fiber fuse can be stopped. In the sixth embodiment, since the laser amplifying device 110B has a single pumping LD 120 only, in the process of step S14, the pumping LD driving power source 121 is stopped along with the pumping LD driving power source of the laser oscillating device 70. In the example of FIG. 8, the pump light cutting filter 51 is provided between the PD 50 and the fusion-spliced portion 134, but when the laser oscillating device 70 employs a backward pumping mode, since the pump light does not reach the fusion-spliced portion 134, the pump light cutting filter 51 may be omitted.

(G) Seventh Embodiment

Figure 9:
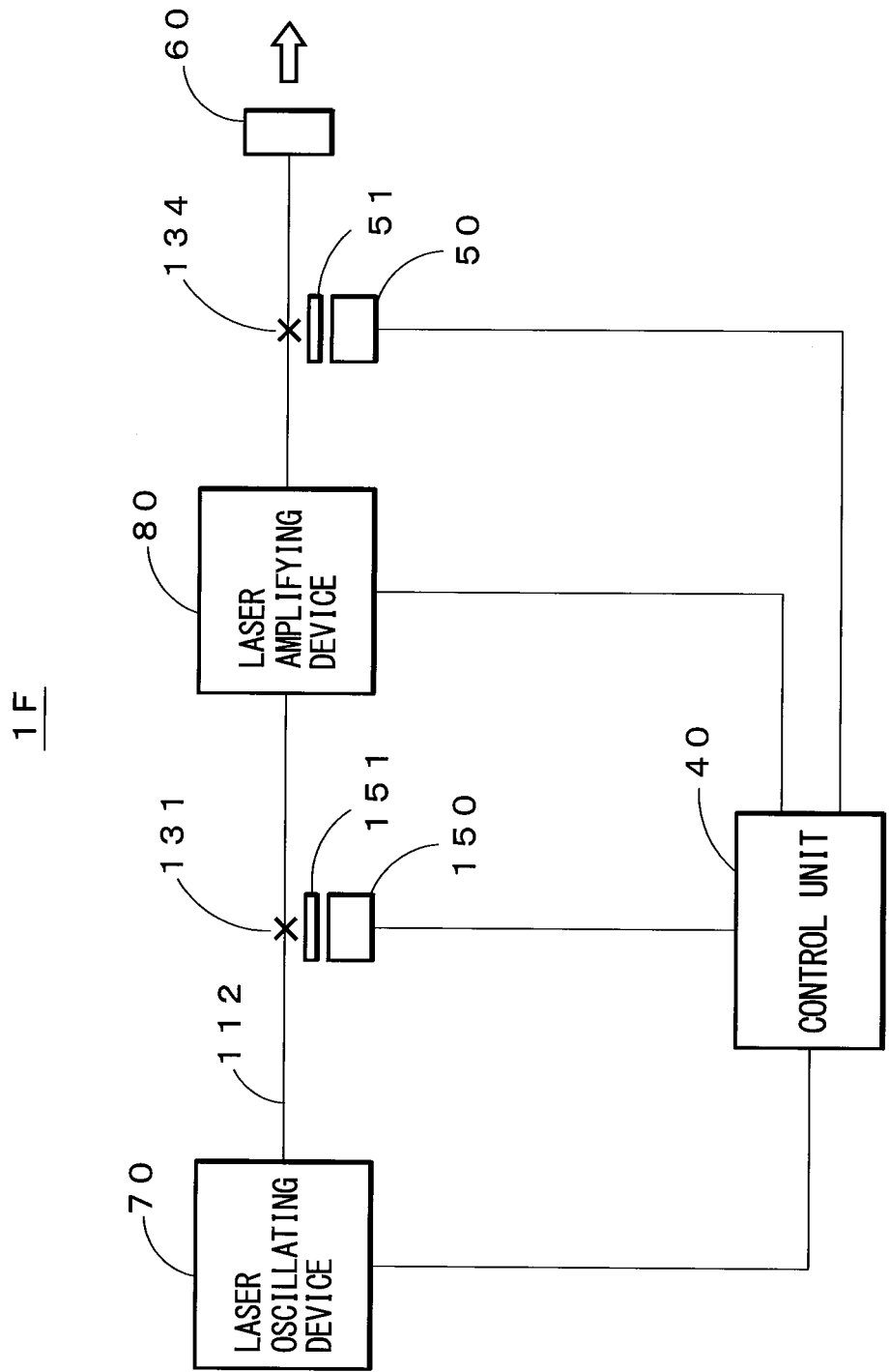
FIG. 9 is a diagram showing an exemplary configuration of a seventh embodiment of the invention.

FIG. 9 is a block diagram showing an exemplary configuration of a seventh embodiment of the invention. The fiber laser apparatus 1F of the seventh embodiment shown in FIG. 9 includes, as its main constituent elements, the control unit 40, the PDs 50 and 150, the pump light cutting filters 51 and 151, the output optics section 60, the laser oscillating device 70, the laser amplifying device 80 and the optical fiber 112. Here, the laser oscillating device 70 is constituted by one of the laser oscillating devices 10, 10A and 10B, shown in FIGS. 1, 4 and 5, respectively. Also, the laser amplifying device 80 is constituted by one of the laser amplifying devices 110, 110A and 110B, shown in FIGS. 6, 7 and 8, respectively. The PD 50 detects the leakage signal light from the fusion-bonded section 134 via the pump light cutting filter 51, and the PD 150 detects the leakage signal light from the fusion-spliced portion 131 via the pump light cutting filter 151.

In the seventh embodiment, operation is performed with a process similar to that of FIG. 3, and the processes of steps S11 and S12 are performed for the PDs 50 and 150, respectively. Specifically, the intensities of leakage signal light Lp1 and Lp2 of the PDs 50 and 150, are detected in the step S11 and compared with the respective thresholds Th1 and Th2 in the step S12. In a case where at least one of Lp1<Th1 and Th2>Lp2 is satisfied, it proceeds to the step S13. And, in step S14, the control unit 40 stops both the pumping LDs of the laser oscillating device 70 and the laser amplifying device 80. Thereby, in a case where a fiber fuse occurs either in the laser oscillating device 70 or in the laser amplifying device 80, the pumping LD is stopped and the progress of the fiber fuse can be stopped. Also, in the seventh embodiment, in step S16, by storing Lp1 and Lp2 together with Ts and Te, it is possible to know in which of the laser oscillating device 70 and laser amplifying device 80 the fiber fuse has occurred. Specifically, in a case where both Lp1<Th1 and Th2>Lp2 hold, it can be determined that a fiber fuse has occurred on the left side (the left hand side in the diagram) from the fusion-spliced portion 131. When only Th1>Lp1 holds, it can be determined that a fiber fuse has occurred between the fusion-spliced portion 131 and the fusion-spliced portion 134.

(H) Eighth Embodiment

Figure 10:
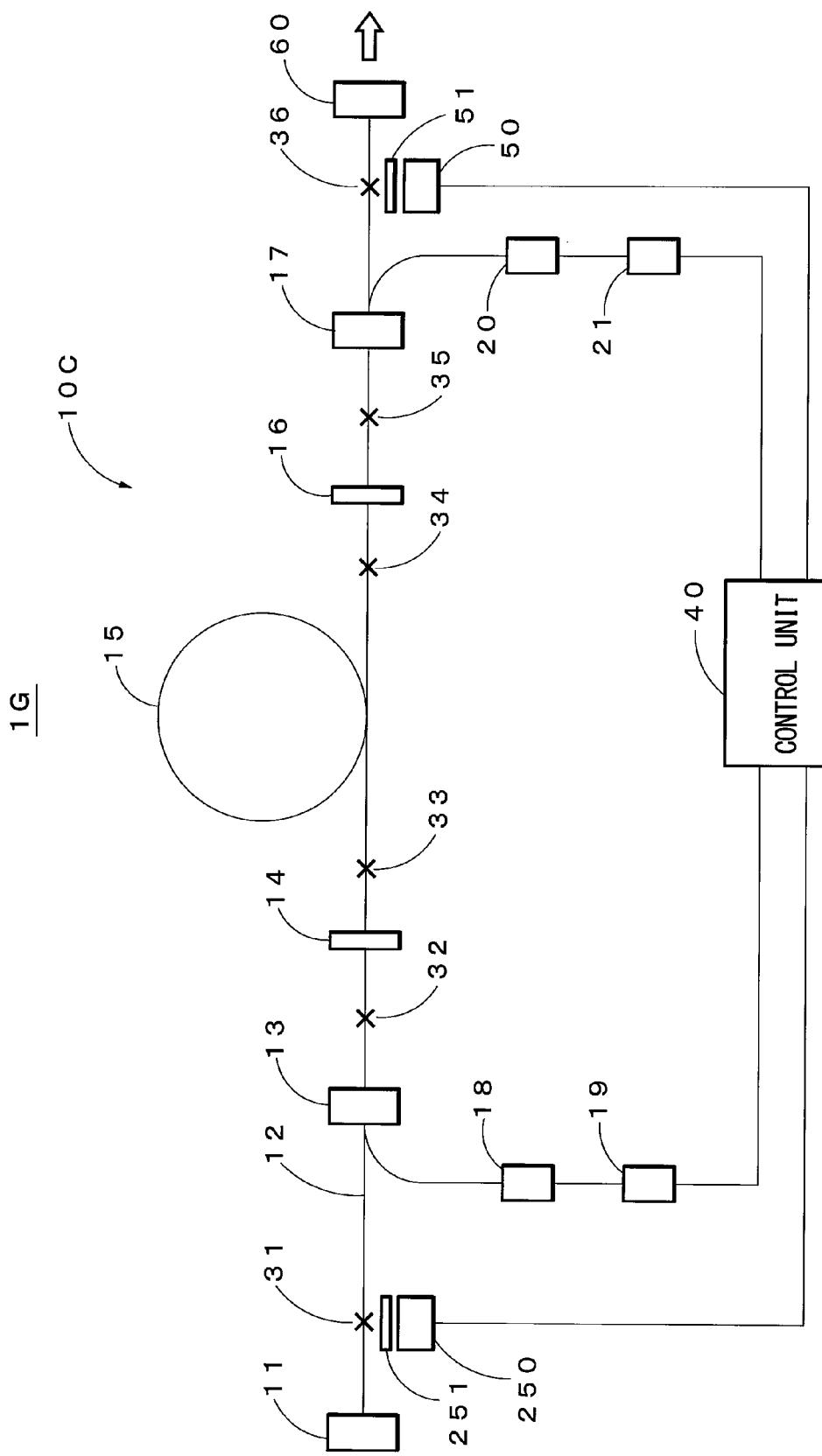
FIG. 10 is a diagram showing an exemplary configuration of an eighth embodiment of the invention.

FIG. 10 is a block diagram showing an exemplary configuration of an eighth embodiment of the invention. In FIG. 10, portions corresponding to those shown in FIG. 1 are labeled with the same reference numerals as in FIG. 1, and explanations thereof are omitted. In the fiber laser apparatus 1G of the eighth embodiment shown in FIG. 10, as compared to the case of FIG. 1, a PD 250 for detecting the leakage signal light from the fusion-spliced portion 31 and a pump light cutting filter 251 are provided, and the PD 250 is connected to the control unit 40. Other structures are similar to those in the case of FIG. 1.

In the eighth embodiment shown in FIG. 10, the fiber fuse occurring on the left-hand side of the pump light multiplexer 13 can be a target of detection. In other words, the HR 14 reflects nearly 99% of the signal light and returns it back to the amplification optical fiber 15, but, for example, about 1% of the signal light will pass through as leakage signal light. Here, in a case where the output of the fiber laser apparatus 1G is about 1 kW, the leakage signal light will be about 10W. Therefore, it is assumed that a fiber fuse also occurs on the left-hand side of the pump light multiplexer 13. Accordingly, in the eighth embodiment, the leakage signal light that leaks from the fusion-spliced portion 31 can be detected by the PD 250, and in a case where the intensity of the leakage signal light becomes less than the threshold Th, it is determined that a fiber fuse has occurred on the left-hand side of the pump light multiplexer 13 and pumping LDs 18 and 20 can be stopped. Specifically, in a normal state in which a fiber fuse is not produced, since a part of the signal light from the amplification optical fiber 15 is outputted as leakage signal light on the left hand side of the HR 14, the leakage signal light is outputted via the pump light multiplexer 13, and it is detected by a PD 250 provided at the fusion-spliced portion 31. Therefore, in this normal state, the intensity Lp of the leakage signal of light is detected by the PD 250. Here, assuming that the fiber fuse occurs near the terminating unit 11, the fiber fuse progresses towards the right hand side in the diagram. Assuming that the fiber fuse moves to the right hand side from the fusion-spliced portion 31, since the leakage signal light from the HR 14 is blocked by the fiber fuse, the intensity Lp of the leakage signal light detected by the PD 250 decreases. Therefore, with the process of step S12 in FIG. 3, it is determined to be Yes and proceeds to the processes of step S13 and onwards, and the driving of the pumping LDs 18 and 20 is stopped, the progress of the fiber fuse stops. Note that, in the embodiment of FIG. 10, threshold Th is, for example, about, for example, $\frac{1}{10}$ of the intensity of the leakage signal light outputted on the left hand side of the HR 14. Of course, it may be a value other than this.

(I) Ninth Embodiment

Figure 11:
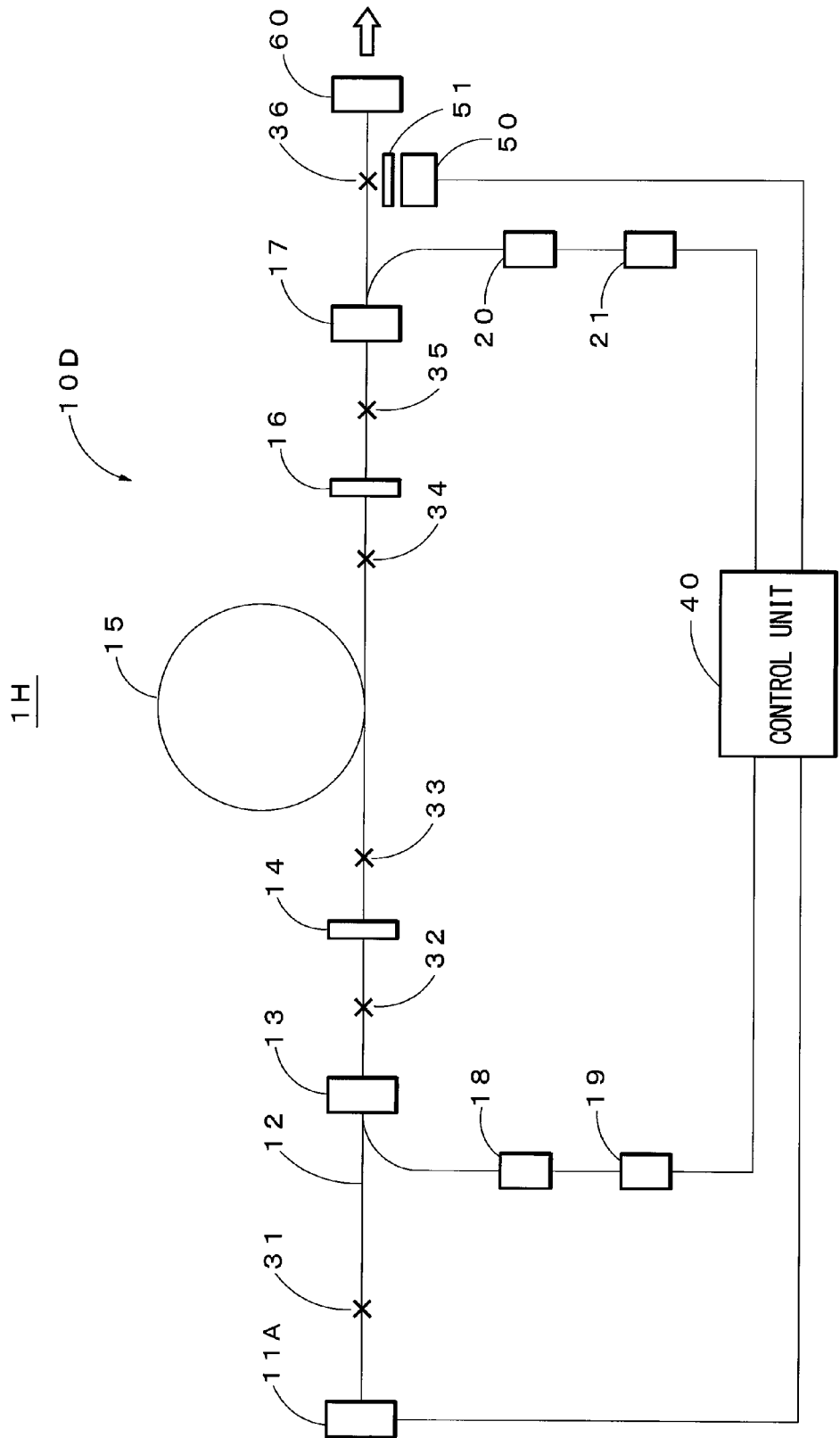
FIG. 11 is a diagram showing an exemplary configuration of a ninth embodiment of the invention.

FIG. 11 is a diagram showing an exemplary configuration of a ninth embodiment of the invention. In FIG. 11, portions corresponding to those shown in FIG. 10 are labeled with the same reference numerals as in FIG. 10, and explanations thereof are omitted. In the fiber laser apparatus 1H of the ninth embodiment shown in FIG. 11, as compared to the case of FIG. 10, the terminating unit 11 is replaced with the PD 11A and the PD 250 and the pump light cutting filter 251 are also excluded. Other structures are similar to those in the case of FIG. 10.

In the ninth embodiment shown in FIG. 11, similarly to the case of FIG. 10, the leakage signal light that leaks on the left hand side of HR 14 is detected by the PD 11A, and in a case where the intensity Lp of the leakage signal light has become less than the threshold Th, it is determined that a fiber fuse has occurred and the driving of the pumping LDs 18 and 20 is stopped. Thereby, similarly to the case of FIG. 10, the fiber fuse occurring on the left-hand side of the pump light multiplexer 13 can also be a target of detection, and the progress of the fiber fuse can be stopped. The threshold Th can be set in a manner similar to the setting in the case of the eighth embodiment.

(J) Tenth Embodiment

Figure 12:
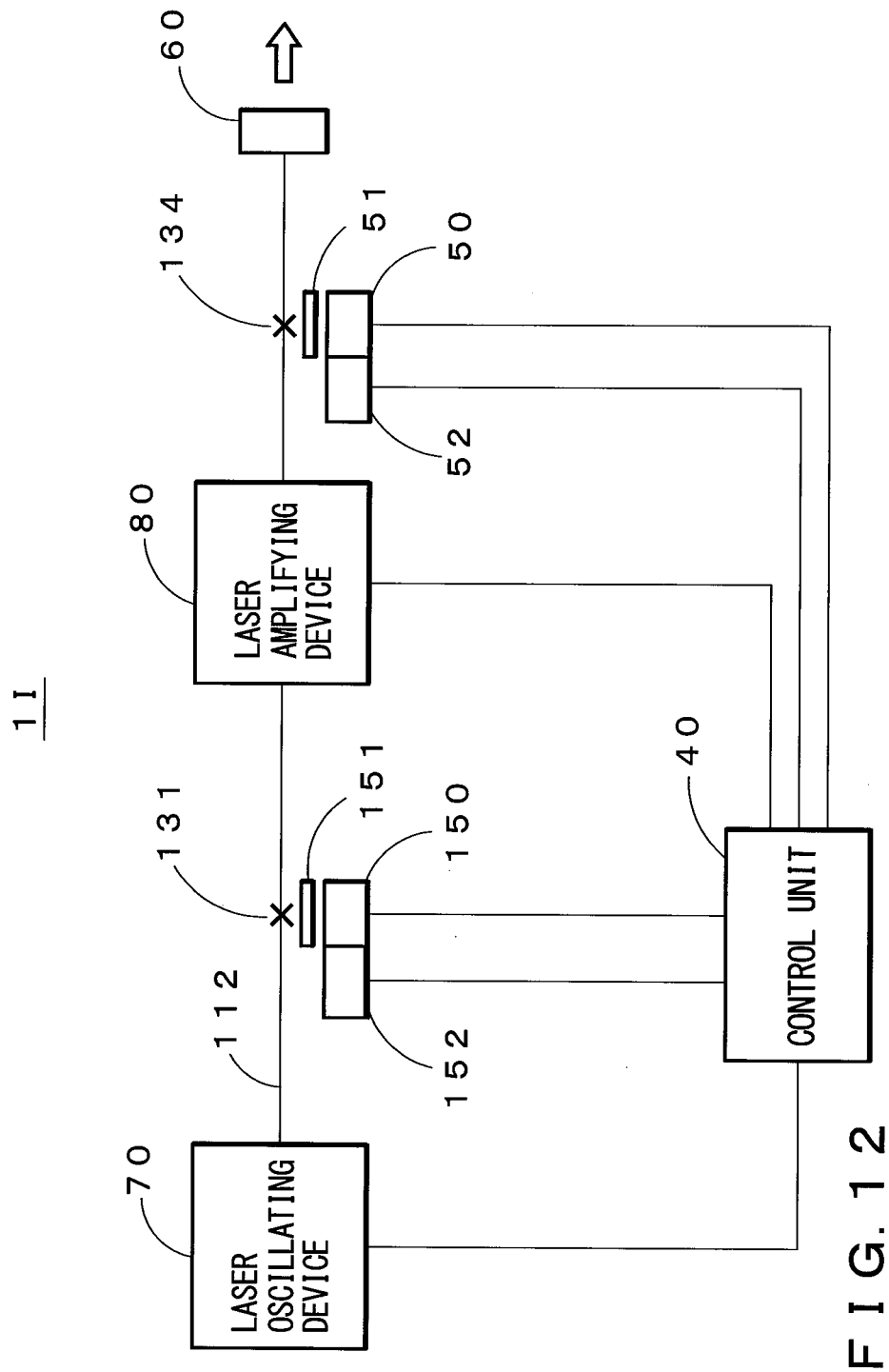
FIG. 12 is a diagram showing an exemplary configuration of a tenth embodiment of the invention.

FIG. 12 is a diagram showing an exemplary configuration of a tenth embodiment of the invention. In FIG. 12, portions corresponding to those shown in FIG. 9 are labeled with the same reference numerals as in FIG. 9, and explanations thereof are omitted. In the fiber laser apparatus 1I of the tenth embodiment shown in FIG. 12, a thermistor 52 is thermally coupled to the PD 50 and the thermistor 52 is connected to the control unit 40 as compared to the case of FIG. 9. Also, a thermistor 152 is thermally coupled to the PD 150 and the thermistor 152 is connected to the control unit 40 as compared to the case of FIG. 9. Other structures are similar to those in the case of FIG. 9.

In the tenth embodiment shown in FIG. 12, the control unit 40 corrects a detection signal from the PD 50 and 150 by the thermistors 52 and 152. That is to say, since the detected voltages of the PD 50 and 150 are inversely proportional to an ambient temperature, the control unit 40 corrects the detected voltages based on the temperature detected by the thermistors 52 and 152 so as not to depend on the ambient temperature. Thereby, with the PDs 50 and 150, the intensity of the leakage signal light can be detected precisely irrespective of the ambient temperature.

In the tenth embodiment, similarly to the case of the seventh embodiment, it is possible to know in which of the laser oscillating device 70 and the laser amplifying device 80 a fiber fuse has occurred, and similarly to the cases of FIGS. 10 and 11, the fiber fuse that occurs by the leakage signal light that leaks on the left hand side of HR 14 can be detected. That is to say, when a fiber fuse occurs near the terminating unit 11, not shown, of the laser oscillating device 70 and progresses towards the right hand side of FIG. 12 and arrives at the pump light multiplexer 13, the pump light multiplexer 13 breaks and the introduction of the pump light from the pumping LD18 is blocked. Therefore, for example, if the pumping LDs used in the laser oscillating device 70 and the laser amplifying device 80 are of the same optical intensity, and the introduction of the pump light into the pump light multiplexer 13 was completely blocked, the intensity of the signal light is attenuated to ½ in the fusion-spliced portion 131 and attenuates to ¾ in the fusion-spliced portion 134. Accordingly, when the intensity of the leakage signal light is attenuated to ½ and ¾ as described above, it can be determined that fiber fuse has occurred near the terminating unit 11. Here, since the detecting signals of the PDs 50 and 150 are corrected by the thermistors 52 and 152, the change in detection signal can be positively detected. Also, in the tenth embodiment, an occurrence of the fiber fuse between the pumping LD and the pump light multiplexer can also be detected. For example, outputs of the PD 150 and PD 50 decrease when a fiber fuse occurs between pumping LD18 and pump light multiplexer 13. For example, when each pumping LD is formed of five LDs, in a case where a fiber fuse has occurred in the optical fiber of one pumping LD, the output decreases by $\frac{1}{10}$ for the PD 150, and in the PD50, the output decrease by $\frac{1}{20}$. Therefore, by accurately detecting the intensity of the leakage signal light, the fiber fuse that occurs between the pumping LD and the pump light multiplexer can be detected and the progress can be stopped.

In the above, the thermistors 52 and 152 are provided for the PDs 50 and 150, respectively, but may be provided for one of them and the pumping LD may be cut off when either of intensity changes of the leakage signal light is detected.

In each of the aforementioned embodiments, a value that is substantially proportional to a number of pumping LDs to be driven or a value corresponding to intensity of the output light obtained by the number of pumping LDs to be driven and the driving current may be set as the threshold Th. Accordingly, for example, in a case where a fiber fuse has occurred in one of the pumping LDs and has come out of the range of the intensity of the output light of the fiber laser that should be normally obtained, the fiber fuse can be detected from the slight output light variation and its progress can be appropriately stopped.

Also, in the cases of an MOPA configuration as described in embodiments 4-7 and 10, as has been described for the tenth embodiment, a different constant of proportion can be given to each of the laser oscillating device and the laser amplifying device and the value that is substantially proportional to the number of pumping LDs to be driven or the value corresponding to the intensity of the output light obtained by the number of pumping LDs to be driven and the driving current are multiplied, and a threshold corresponding to the intensity of output light obtained by considering them together. In this manner, the threshold corresponding to the state of operation of the fiber laser can be set accurately and the fiber fuse detection can be performed at an improved accuracy.

Further, as in the seventh and ninth embodiments, in determining the point of occurrence of fiber fuse by monitoring output light at each of the laser oscillating device and the laser amplifying device, a determining section that performs the determination process as described in the seventh embodiment may be provided, and the determination can be performed automatically by arranging the determining section in the control unit 40 or connecting the determining section to an external section. Further, a display section that displays a determination result may be provided and an output unit that outputs a signal to an external unit (PC, etc.) may be provided.

(K) Variant Embodiments

Each of the aforementioned embodiments is provided by way of example only, and there may be other various variant embodiments. For example, in each of the aforementioned embodiments, the leakage signal light from the fusion-spliced portion is detected, but, as shown in FIG. 13, it is possible to detect the leakage signal light from a portion where optical systems (optical fiber or condenser lens, etc.) are spaced apart at a predetermined distance and optically connected with each other as shown in FIG. 13. In the example of FIG. 13, the signal light passes through an optical fiber 164 via a connecting portion 160, and is irradiated onto a work piece via an output optics section 165. Here, the connecting portion 160 has an output optics section 161 and an input optics section 162, and the output optics section 161 and the input optics section 162 are spaced apart at a predetermined interval. The PD 163 receives leakage signal light leaking out of a core of the output optics section 161 incident thereon and converts it into a corresponding electric signal and supplies it to the control unit 40. In this manner, the leakage signal light may be detected at a portion other than the fusion-spliced portion, and is not limited to the fusion-spliced portion.

Also, in each of the above-mentioned embodiments, the pump light is attenuated by the pump light cutting filter. However, for example, it is possible to provide, at an upstream stage of the fusion-spliced portion, an optical fiber for releasing the light other than core light to the exterior and to fusion splice it with the optical fiber 12, and thereby attenuate the pump light. Of course, a method other than this may be employed.

Also, in each of the aforementioned embodiments, the pumping LD is driven by the pumping LD driving power source. However, the control unit 40 may directly drive each pumping LD or control an FET (Field Effect Transistor) based on a control signal from the control unit and may control an electric current flowing through each pumping LD by the FET.

Also, in each of the aforementioned embodiments, in a case where a fiber fuse has occurred, operation of all pumping LDs is stopped. However, in a case where the progress of the fiber fuse can be stopped by stopping the operation of some of the pumping LDs, operation of some of the pumping LDs may be stopped.

Also, in each aforementioned embodiment, an occurrence of the fiber fuse is determined by the control unit 40 shown in FIG. 2. However, other than this, for example, a hardware using a logic circuit may be used or a FPGA (Field-Programmable Gate Array) may be used.

What is claimed is:

1. A fiber laser apparatus in which pump light is introduced into an optical fiber to generate laser light, the fiber laser apparatus comprising:
   a detecting section that detects signal light leaking out from a core of the optical fiber as leakage signal light;
   a determining section that determines that, in a case where there is a decrease in an intensity of the leakage signal light detected in the detecting section, a failure of the fiber has occurred;
   a stopping section that stops, in a case where the determining section has determined that a failure of the fiber has occurred, the introduction of the pump light into the optical fiber; and
   a forward pumping light-multiplexer that multiplexes the laser light for pumping,
   the detecting section detecting the leakage signal light leaking out of a High Reflectivity Fiber Bragg Grating (FBG) that is provided on a side opposite to an output side of the laser light and the leakage signal light leaks out nearer a terminal side of the forward pumping light-multiplexer,
   wherein, in a case where an intensity of the leakage signal light has become smaller than a predetermined threshold, it is determined that a failure of the fiber has occurred nearer a terminal side beyond the forward pumping light-multiplexer, and stops the pump light.

2. The fiber laser apparatus according to claim 1, wherein a delay time is provided in the determining of the occurrence of failure of the fiber by the determining section, and further comprising:
   an optical component, which is optically connected to the optical fiber, having a fiber length that is longer than a length in which a fiber fuse progresses from a time at which a decrease in the leakage signal light is detected by the detecting section to a time at which the pump light is stopped by the stopping section.

3. The fiber laser apparatus according to claim 1, further comprising a fusion-spliced portion at which the optical fiber is fusion-spliced, and the detecting section detects the leakage signal light leaking out of the fusion-spliced portion.

4. The fiber laser apparatus according to claim 1, further comprising a plurality of optical fibers including the optical fiber, the plurality of optical fibers being arranged at a predetermined distance between each other, and the detecting section detects the leakage signal light that diffuses and leaks from between the plurality of optical fibers.

5. The fiber laser apparatus according to claim 1, wherein the detecting section detects the leakage signal light via an attenuating section that transmits the laser light and attenuates the pump light.

6. A fiber laser apparatus in which pump light is introduced into an optical fiber to generate laser light, the fiber laser apparatus comprising:
   a detecting section that detects signal light leaking out from a core of the optical fiber as leakage signal light;

a determining section that determines that, in a case where there is a decrease in an intensity of the leakage signal light detected in the detecting section, a failure of the fiber has occurred; and a stopping section that stops, in a case where the determining section has determined that a failure of the fiber has occurred, the introduction of the pump light into the optical fiber, the detecting section detecting the leakage signal light leaking out of a High Reflectivity Fiber Bragg Grating (FBG) that is provided on a side opposite to an output side of the laser light, wherein the detecting section is constituted by a photodiode, the fiber laser apparatus further comprising a correcting section that detects a temperature of the photodiode and corrects a detection signal of the photodiode based on a detected temperature.

7. A fiber laser apparatus in which pump light is introduced into an optical fiber to generate laser light, the fiber laser apparatus comprising:

a detecting section that detects signal light leaking out from a core of the optical fiber as leakage signal light;

a determining section that determines that, in a case where there is a decrease in an intensity of the leakage signal light detected in the detecting section, a failure of the fiber has occurred; and a stopping section that stops, in a case where the determining section has determined that a failure of the fiber has occurred, the introduction of the pump light into the optical fiber, the detecting section detecting the leakage signal light leaking out of a High Reflectivity Fiber Bragg Grating (FBG) that is provided on a side opposite to an output side of the laser light, the fiber laser apparatus further comprising a storing section that stores information indicating time taken from detection of a decrease in an intensity of the leakage signal light to stoppage of the pump light.

8. A fiber laser apparatus in which pump light is introduced into an optical fiber to generate laser light, the fiber laser apparatus comprising:

a detecting section that detects signal light leaking out from a core of the optical fiber as leakage signal light;

a determining section that determines that, in a case where there is a decrease in an intensity of the leakage signal light detected in the detecting section, a failure of the fiber has occurred; and a stopping section that stops, in a case where the determining section has determined that a failure of the fiber has occurred, the introduction of the pump light into the optical fiber, the detecting section detecting the leakage signal light leaking out of a High Reflectivity Fiber Bragg Grating (FBG) that is provided on a side opposite to an output side of the laser light, wherein, in a case where the laser light is a pulsed light, the determining section prevents an occurrence of a failure of the fiber, based on an average value of intensities of the leakage signal light of a plurality of cycles.

9. The fiber laser apparatus according to claim 1, wherein a pump light multiplexer that introduces the pump light into the optical fiber has a free port among a plurality of pump light introducing ports and at least one of a terminal end at a side opposite to a laser light-output side and the free port serves as a visible light introducing port.

10. A fiber laser apparatus in which pump light is introduced into an optical fiber to generate laser light, the fiber laser apparatus comprising:

a detecting section that detects signal light leaking out from a core of the optical fiber as leakage signal light;

a determining section that determines that, in a case where there is a decrease in an intensity of the leakage signal light detected in the detecting section, a failure of the fiber has occurred;

a stopping section that stops, in a case where the determining section has determined that a failure of the fiber has occurred, the introduction of the pump light into the optical fiber, and an amplifying section that amplifies the laser light by an optical fiber, the detecting section detecting the leakage signal light leaking out of a connection between optical fibers, the connection being a connection that is located nearest to an output end from which the laser light is outputted, the detecting section detecting leakage signal light that is the laser light outputted from the amplifying section leaking out from a core of the optical fiber, wherein the detecting section is constituted by a photodiode, the fiber laser apparatus further comprising a correcting section that detects a temperature of the photodiode and corrects a detection signal of the photodiode based on a detected temperature.

11. A fiber laser apparatus in which pump light is introduced into an optical fiber to generate laser light, the fiber laser apparatus comprising:

a detecting section that detects signal light leaking out from a core of the optical fiber as leakage signal light;

a determining section that determines that, in a case where there is a decrease in an intensity of the leakage signal light detected in the detecting section, a failure of the fiber has occurred;

a stopping section that stops, in a case where the determining section has determined that a failure of the fiber has occurred, the introduction of the pump light into the optical fiber, and an amplifying section that amplifies the laser light by an optical fiber, the detecting section detecting the leakage signal light leaking out of a connection between optical fibers, the connection being a connection that is located nearest to an output end from which the laser light is outputted, the detecting section detecting leakage signal light that is the laser light outputted from the amplifying section leaking out from a core of the optical fiber, the fiber laser apparatus further comprising a storing section that stores information indicating time taken from detection of a decrease in an intensity of the leakage signal light to stoppage of the pump light.

12. A fiber laser apparatus in which pump light is introduced into an optical fiber to generate laser light, the fiber laser apparatus comprising:

a detecting section that detects signal light leaking out from a core of the optical fiber as leakage signal light;

a determining section that determines that, in a case where there is a decrease in an intensity of the leakage signal light detected in the detecting section, a failure of the fiber has occurred;

a stopping section that stops, in a case where the determining section has determined that a failure of the fiber has occurred, the introduction of the pump light into the optical fiber, and an amplifying section that amplifies the laser light by an optical fiber, the detecting section detecting the leakage signal light leaking out of a connection between optical fibers, the connection being a connection that is located nearest to an output and from which the laser light is outputted, the detecting section detecting leakage signal light that is the laser light outputted from the amplifying section leaking out from a core of the optical fiber, wherein, in a case where the laser light is a pulsed light, the determining section prevents an occurrence of a failure of the fiber, based on an average value of intensities of the leakage signal light of a plurality of cycles.

13. A fiber laser apparatus in which pump light is introduced into an optical fiber to generate laser light, the fiber laser apparatus comprising:

a detecting section that detects signal light leaking out from a core of the optical fiber as leakage signal light;

a determining section that determines that, in a case where there is a decrease in an intensity of the leakage signal light detected in the detecting section, a failure of the fiber has occurred;

a stopping section that stops, in a case where the determining section has determined that a failure of the fiber has occurred, the introduction of the pump light into the optical fiber, and an amplifying section that amplifies the laser light by an optical fiber, the detecting section detecting the leakage signal light leaking out of a connection between optical fibers, the connection being a connection that is located nearest to an output end from which the laser light is outputted, the detecting section detecting leakage signal light that is the laser light outputted from the amplifying section leaking out from a core of the optical fiber, wherein a pump light multiplexer that introduces the pump light into the optical fiber has a free port among a plurality of pump light introducing ports and at least one of a terminal end at a side opposite to a laser light-output side and the free port serves as a visible light introducing port.

14. A method of detecting a failure of a fiber laser apparatus in which pump light is introduced into an optical fiber to generate laser light, the method comprising:

detecting leakage signal light leaking out from a High Reflectivity Fiber Bragg Grating (FBG) that is provided on a side opposite to an output side of the laser light as signal light leaking out of a core of the fiber and the leakage signal light leaks out nearer a terminal side of a forward pumping light-multiplexer;

determining that, in a case where an intensity of the detected leakage signal light has decreased, a failure of the fiber has occurred; and stopping, in a case where it is determined that a failure of the fiber has occurred, the introduction of the pump light into the optical fiber, wherein, in a case where an intensity of the leakage signal light has become smaller than a predetermined threshold, it is determined that a failure of the fiber has occurred nearer a terminal side beyond the forward pumping light-multiplexer, and stops the pump light.

15. The fiber laser apparatus according to claim 10, wherein the determining section determines whether a failure of the fiber has occurred, based on one of a threshold which is a fixed value, a threshold which varies depending on the pump light or a setting of an intensity of the laser light, and a threshold which varies depending on a value of an electric current flowing through a laser diode that generates the pump light.

16. The fiber laser apparatus according to claim 11, further comprising another detecting section that detects leakage signal light and provided between a laser oscillating section that oscillates the laser light and the amplifying section, the determining section specifying a position at which a failure of the fiber has occurred, based on detection results from both the detecting section and the other detecting section.

17. The fiber laser apparatus according to claim 12, wherein a delay time is provided in the determining of the occurrence of failure of the fiber by the determining section, an optical component, which is optically connected to the optical fiber, having a fiber length that is longer than a length in which a fiber fuse progresses from a time at which a decrease in the leakage signal light is detected by the detecting section to a time at which the pump light is stopped by the stopping section.

18. The fiber laser apparatus according to claim 10, wherein a fusion-spliced portion is a portion at which the optical fibers are fusion-spliced, and the detecting section detects the leakage signal light leaking out of the fusion-spliced portion.

19. The fiber laser apparatus according to claim 10, wherein the optical fibers are arranged at a predetermined distance between each other, and the detecting section detects the leakage signal light that diffuses and leaks from between the fibers.

20. The fiber laser apparatus according to claim 10, wherein the detecting section detects the leakage signal light via an attenuating section that transmits the laser light and attenuates the pump light.

21. The fiber laser apparatus according to claim 6, wherein the detecting section detects the leakage signal light via an attenuating section that transmits the laser light and attenuates the pump light.

* * * * *